Nov. 29, 1966    N. T. M. DENNIS    3,288,354
VAPOR DIFFUSION PUMPS
Filed May 28, 1964
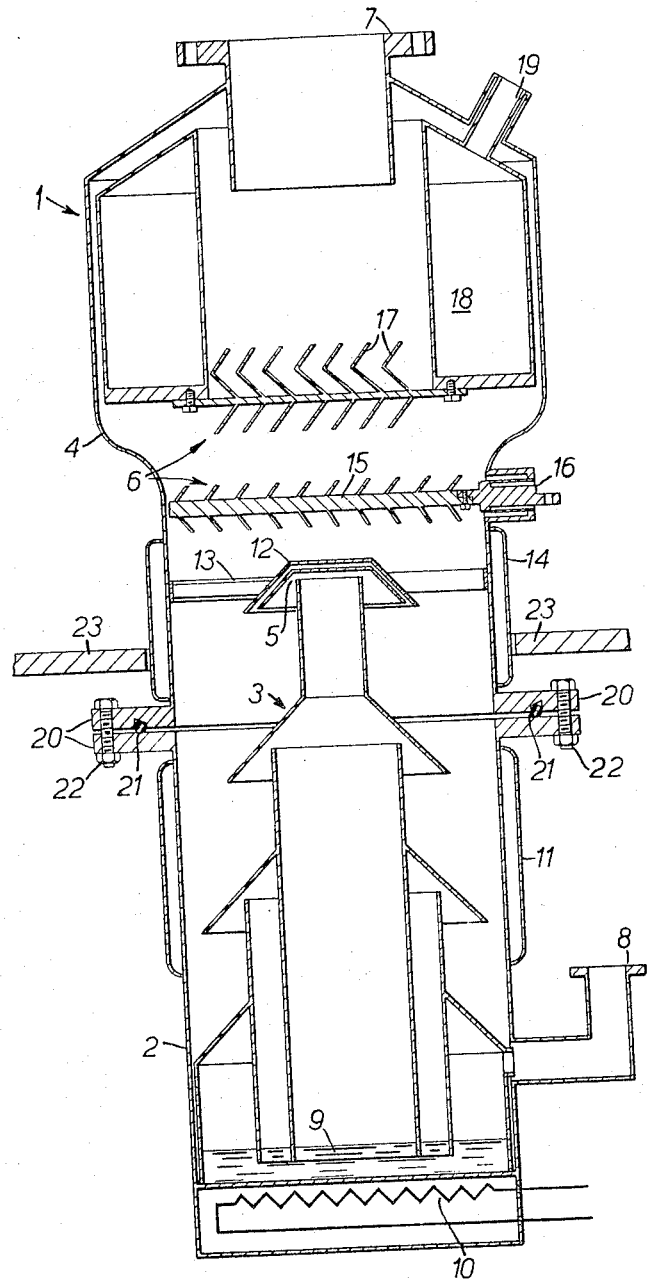
INVENTOR
NIGEL T. M. DENNIS,
BY Hall & Houghton
ATTORNEY

United States Patent Office 3,288,354
Patented Nov. 29, 1966

3,288,354
VAPOR DIFFUSION PUMPS
Nigel T. M. Dennis, Crawley, Sussex, England, assignor to Edwards High Vacuum International Limited, Crawley, Sussex, England, a British company
Filed May 28, 1964, Ser. No. 370,950
Claims priority, application Great Britain, May 30, 1963, 21,726/63
5 Claims. (Cl. 230—101)

The present invention relates to vacuum pumping units incorporating diffusion pumps and provides an improved construction for such pumps for attaining very high or ultra high vacuum.

A major consideration when achieving ultra high vacuum is the vapour and gas evolution from all internal surfaces exposed inside the vacuum system. It greatly eases and accelerates the production of very high or ultra high vacuum if gas or vapour adsorbed or absorbed on such surfaces is driven off by controlled heating or baking at the beginning of the pumping cycle so that the residual gas or vapour evolution after the bake is over is at a very greatly reduced rate.

Such baking is best carried out at a temperature which is higher than that which can normally be sustained by conventional organic gasket materials and it is difficult to degas organic gasket materials to a condition where their gas and vapour evolution is too low to be troublesome in this sort of application. According to the present invention there is provided a vapor diffusion pump for the production of ultra high vacua comprising an upper structure including a cooled trap and a baffle, such structure requiring baking for the purpose of removing gases inimical to the production of high vacua, the pump further comprising a lower structure including a boiler for a working fluid, at least one vapor tube and jet, said upper and lower structures being provided with coupling flanges, means coupling said flanges, and a gasket disposed between said flanges, the jet, on assembly of said upper and lower structures, being positioned above said gasket whereby when said upper structure is baked said gasket is not subjected to heat which might result in the evolution of gases from said gasket.

Present practice, when using metal diffusion pumps, is to connect the mouth of a diffusion pump by means of a flange joint to some trapping means for suppressing the vapour of the diffusion pump working fluid. This may be a water cooled or refrigerated baffle. This baffle is then usually connected by means of a similar flange joint to a second trapping arrangement which may consist of a liquid nitrogen cooled trap or a sorbent trap or some other type. This latter is then connected by a third flange joint to the system to be evacuated.

It may be necessary for all these joints to be made with metal gaskets if the best results are to be achieved and in some cases it will be required that they should all withstand vacuum baking. Occasionally one of the trapping means mentioned may be omitted and a flange joint thus eliminated.

The object of the present invention is to provide a construction of vacuum pumping unit which reduces or eliminates the problems arising from the use of flanged joints.

According to the present invention, a vacuum pumping unit includes a housing of which a first integral part and a second integral part are connected together by coupling means including a gasket, the first part surrounding the lower portion of a diffusion pump and the second part surrounding the upper portion of the diffusion pump, the upper portion including a jet and one or more baffles and/or cooled traps, the gasket being positioned in a region of the unit where degassing by baking is unnecessary.

The gasket may be composed of an elastomer but where an organic material is not acceptable, a gasket of metal may be used.

The pumping unit may further include cooling means external to one or both parts of the housing, and the diffusion pump included in the unit may be a mercury or oil vapour diffusion pump.

The invention will now be described in greater detail by way of example and with reference to the accompanying drawing which shows one embodiment of the invention.

Referring to the drawing, a vacuum pumping unit 1 is constructed with a lower housing 2 enclosing the lower portion of a mercury vapour diffusion pump generally indicated at 3, and an upper housing 4 enclosing the top pumping jet 5 of the diffusion pump 3 and a baffle/trap assembly, generally indicated at 6, above the mouth of the diffusion pump. A flanged opening 7 on the upper housing 4 is connected to the system to be evacuated (not shown). A flanged outlet 8 on the lower housing 2 is connected to a backing pump or other pumping units (not shown).

The diffusion pump 3 is of conventional design having a pumping liquid reservoir 9 heated by a heating element 10. A water cooling jacket 11 is mounted on the exterior of the lower housing 2 in order to condense the pumping liquid vapour. The top pumping jet 5 is positioned above the joint between the upper and lower housings and is provided with a cooled cowl 12 supported by struts 13 attached to the interior of the upper housing 4, the cooling being provided by a water jacket 14 mounted on the exterior of the upper housing.

A chevron type baffle 15 is mounted above the pump mouth and conduction cooled through a copper bar 16 by a cooling device (not shown) which may be bolted to the external end of the bar.

Above the chevron baffle is mounted a Z type liquid nitrogen cooled trap 17 secured to the bottom of an annular liquid nitrogen reservoir 18 provided with filling neck 19.

The portions of the housing 2 and 4 are joined by cooperating flanges 20 between which is placed an elastomeric sealing ring 21, the flanges 20 being tightly held together by bolts 22.

In a degassing operation prior to using the pumping unit the portions lying above a heat resisting baffle in the form of a platform 23, positioned below the top pumping jet 5 but above the elastomer seal 21, are baked. During such a bake the elastomer flange joint is adequately cooled by the water jacket 11 and, since the diffusion pump cannot be operated in this condition, a second diffusion pump is attached to the outlet 8 to provide vacuum during the bake in the conventional way.

Once the upper portions of the pumping unit have been degassed and the pumping unit is in use any gas or vapour evolved from the elastomer seal cannot escape into the system being evacuated since it is positioned below the top pumping jet 5. Thus the positioning of the seal between the upper and lower portions of the housing at the same time provides a convenient construction which is easily demounted for access to the various components in the pumping unit for servicing or modification etc., and allows the use of an elastomer seal with its associated advantages of reliability and simplicity in a position where degassing by baking is unnecessary.

In alternative embodiments of the invention the cooling jackets may be replaced by cooling coils and alternative types or numbers of baffle or trap elements may be used. The diffusion pump may be operated by use of any conventional vapour, for example any suitable oil vapour.

The heat shield 23 although shown positioned just above the flanged joint is not restricted to that position and may be positioned anywhere below the baffle 15 and above the flanged joint.

I claim:

1. A vapor diffusion pump for the production of ultra high vacua comprising an upper structure including a cooled trap and a baffle, such structure requiring baking for the purpose of removing gases inimical to the production of high vacua, the pump further comprising a lower structure including a boiler for a working fluid, at least one vapor tube and jet, said upper and lower structures being provided with coupling flanges, means coupling said flanges, and a gasket disposed between said flanges, the jet, on assembly of said upper and lower structures, being positioned above said gasket whereby when said upper structure is baked said gasket is not subjected to heat which might result in the evolution of gases from said gasket.

2. A pump according to claim 1 in which there are two jets such that on assembly of said upper and lower structures one jet is positioned above said gasket and the other jet is positioned below said gasket.

3. A pump according to claim 1 in which said gasket is composed of an elastomer.

4. A pump according to claim 2 in which said gasket is composed of an elastomer.

5. A pump according to claim 1 provided with cooling means disposed external to said upper and lower structures.

References Cited by the Examiner

UNITED STATES PATENTS

| | | | |
|---|---|---|---|
| 2,508,765 | 5/1950 | Morand | 230—101 |
| 3,102,678 | 9/1963 | Levenson | 230—101 |
| 3,168,819 | 2/1965 | Santeler | 230—101 X |
| 3,181,776 | 5/1965 | Hablanian et al. | 230—101 |

FOREIGN PATENTS

| | | |
|---|---|---|
| 1,171,098 | 9/1958 | France. |
| 587,800 | 5/1947 | Great Britain. |

MARK NEWMAN, *Primary Examiner.*

WARREN E. COLEMAN, *Examiner.*